United States Patent
Mizuno et al.

(10) Patent No.: US 9,696,708 B2
(45) Date of Patent: Jul. 4, 2017

(54) MACHINING CURVE CREATING APPARATUS AND MACHINING CURVE CREATING METHOD THEREOF

(71) Applicant: FANUC Corporation, Minamitsuru-gun, Yamanashi (JP)

(72) Inventors: Tohru Mizuno, Minamitsuru-gun (JP); Takuji Chiba, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 343 days.

(21) Appl. No.: 14/514,651

(22) Filed: Oct. 15, 2014

(65) Prior Publication Data

US 2015/0112474 A1    Apr. 23, 2015

(30) Foreign Application Priority Data

Oct. 23, 2013  (JP) ................ 2013-220539

(51) Int. Cl.
*G05B 19/18*    (2006.01)

(52) U.S. Cl.
CPC .. *G05B 19/182* (2013.01); *G05B 2219/50164* (2013.01)

(58) Field of Classification Search
CPC .................... G05B 19/182; G05B 2219/50164
See application file for complete search history.

(56) References Cited

U.S. PATENT DOCUMENTS

| | | | |
|---|---|---|---|
| 5,369,592 A | 11/1994 | Honda | |
| 6,311,098 B1 * | 10/2001 | Higasayama | G05B 19/4099 700/159 |
| 6,542,785 B1 * | 4/2003 | Honda | G05B 19/4099 700/186 |
| 6,632,053 B2 * | 10/2003 | Koch | G05B 19/4061 409/132 |
| 6,823,234 B2 * | 11/2004 | Otsuki | G05B 19/4103 700/181 |

(Continued)

FOREIGN PATENT DOCUMENTS

| | | |
|---|---|---|
| JP | H05-143140 A | 6/1993 |
| JP | H06-214633 A | 8/1994 |

(Continued)

OTHER PUBLICATIONS

Notificaiton of Reasons for Refusal issued Jun. 30, 2015 in Japanese Patent Application No. 2013-220539 (3 pages) with English Translation (3 pages).

(Continued)

*Primary Examiner* — Ramesh Patel
(74) *Attorney, Agent, or Firm* — Drinker Biddle & Reath LLP

(57) ABSTRACT

A machining curve creating apparatus create curve of a tool used to machine a workpiece by repeating a procedure of taking, as a partial point sequence, a part of a point sequence expressing the tool path and generating a partial curve. The machining curve creating apparatus includes stored-information-utilized curve generating unit for generating a partial curve utilizing segmented curve information. When curve information utilization determining unit determines to utilize the stored information, the stored-information-utilized curve generating unit generates a partial curve.

8 Claims, 6 Drawing Sheets

(56) References Cited

U.S. PATENT DOCUMENTS

| | | | | |
|---|---|---|---|---|
| 6,993,412 | B2* | 1/2006 | Uhlich | G05B 19/4103 700/187 |
| 7,684,891 | B2* | 3/2010 | Okrongli | G05B 19/4083 234/13 |
| 7,792,604 | B2* | 9/2010 | Hong | G05B 19/41 700/187 |
| 8,843,230 | B2* | 9/2014 | Mizuno | G05B 19/41865 318/568.17 |
| 2002/0002420 | A1 | 1/2002 | Hirai et al. | |
| 2004/0122549 | A1* | 6/2004 | Otsuki | G05B 19/4103 700/189 |
| 2004/0138777 | A1* | 7/2004 | Chiba | G05B 19/19 700/187 |
| 2006/0247820 | A1* | 11/2006 | Otsuki | G05B 19/4103 700/189 |
| 2012/0109359 | A1* | 5/2012 | Mizuno | G05B 19/41865 700/173 |
| 2013/0218323 | A1* | 8/2013 | Otsuki | G05B 19/19 700/187 |

FOREIGN PATENT DOCUMENTS

| | | |
|---|---|---|
| JP | H09-201713 A | 8/1997 |
| JP | 2001-092516 A | 4/2001 |
| JP | 2001-142518 A | 5/2001 |
| JP | 2004-078516 A | 3/2004 |
| JP | 2005-182437 A | 7/2005 |
| JP | 2006-309645 A | 11/2006 |
| JP | 2007293478 A | 11/2007 |
| JP | 2013-171376 A | 9/2013 |

OTHER PUBLICATIONS

Les Piegl et al., "The Nurbs Book," 2nd edition, 1997, Monographs in Visual Communication, Springer-Verlag, Curve and Surface Fitting and Global Approximation, pp. 404-453.

I. J. Schoenberg, "Spline Functions and the Problem of Graduation," Proceedings of the National Academy of Sciences of the U.S.A., Aug. 19, 1964, pp. 947-950, vol. 52.

* cited by examiner $$\bar{q} = \frac{1}{m}\sum_{i=1}^{m} \vec{q}_i \qquad \bar{p} = \frac{1}{m}\sum_{i=1}^{m} \vec{p}_i$$

(NOTE) q (BAR) DESCRIBED IN SPECIFICATION IS $\bar{q}$
(NOTE) p (BAR) DESCRIBED IN SPECIFICATION IS $\bar{p}$

MACHINING CURVE CREATING APPARATUS AND MACHINING CURVE CREATING METHOD THEREOF

RELATED APPLICATION DATA

This application claims priority under 35 U.S.C. §119 and/or §365 to Japanese Application No. 2013-220539 filed Oct. 23, 2013, the entire contents is incorporated herein by reference.

BACKGROUND OF THE INVENTION

Field of the Invention

The present invention relates to a machining curve creating apparatus and a machining curve creating machine curve creating method in which a tool path allowing a smooth machined surface to be provided during machining with a numerically controlled machine tool is determined using a numerical control apparatus controlling the machine tool or an information processing apparatus such as a personal computer.

Description of the Related Art

A method is widely known for determining a curve interpolating a given point sequence or a curve passing by each of the points (Les Piegl, Wayne Tiller, The NURBS Book, Springer-Verlag, and I. J. Schoenberg, Spline functions and the problem of graduation, Proceedings of the National Academy of Science of the U.S.A., 52(1964)). For machining with a numerically controlled machine tool, the method is utilized to convert a tool path given as a point sequence into a curve in order to provide a smooth machined surface and to reduce a machining time (Japanese Patent Lid-Open No. 2013-171376, Japanese Patent Lid-Open No. 2007-293478, Japanese Patent Lid-Open No. 2006-309645, Japanese Patent Lid-Open No. 2005-182437, and Japanese Patent Lid-Open No. 2004-078516).

In general, the length of a machining program varies depending on a workpiece, and time-consuming machining involves a very large number of points providing a tool path. Thus, completing curving during one process is difficult, and a method is adopted in which the point sequence is divided into pieces to allow the curve to be generated step by step. Furthermore, this method is inevitably adopted when curve generation and machining are performed in parallel.

The division of the point sequence is normally performed using a method of taking a predetermined number of points starting with the leading point. When the point sequence includes a bent portion, the bent portion is set to be a dividing point of the point sequence even if the number of points up to the bent portion is smaller than the predetermined number. Curves generated from groups of points resulting from the division are expressed in the form of parametric curves. An expression form such as a B spline curve or a NURBS curve is adopted which is suitable for the application.

Conventional machining curve creating focuses on a method for generating curves from a point sequence resulting from division and does not particularly take into account the shape of the entire tool path resulting from joining of generated curves. As a result, disadvantageously, satisfactory curves fail to be generated when adjacent curves are desired to be similar in shape as in the case of a forward path and a backward path of a reciprocating machining path.

In general, in a machining program output by a CAM, the positions of points expressing a machine path may deviate slightly from a target path in connection with a calculation method or the like. Furthermore, the interval between the points commonly varies. In the reciprocating path, points providing the forward path do not always correspond to points providing the backward path. In the point sequence dividing method of taking a predetermined number of points, the spatial distribution of the divisions of the point sequence varies between the forward path and the backward path. The different spatial distributions of the point sequence in turn vary the shape of the generated curve, leading to step-like differences between the curve of the forward path and the curve of the backward path. A similar problem occurs in the case of a spiral tool path that is placed around the circumference of a workpiece. The cause of the problem is that the method of taking a predetermined number of points fails to control the spatial distribution of point sequences. This indicates the need of a dividing method allowing the spatial distributions to be aligned with each other.

SUMMARY OF THE INVENTION

Thus, an object of the present invention is to provide, in order to solve the above-described problem of the conventional technique, a machining curve creating apparatus which stores information on a curve generated based on a point sequence expressing a tool path and which utilizes the information in an area where a curve similar to another curve is desired to be provided, to generate the desired curve.

A machining curve creating apparatus according to an embodiment of the preset invention creates a machining curve of a tool used to machine a workpiece by repeating a procedure of taking, as a partial point sequence, a part of a point sequence expressing the tool path and generating a partial curve. The machining curve creating apparatus includes curve information storage unit for storing, for each of segmented curves that are individual curve sections providing the tool path, segmented curve information comprising a number of partial curves included in the segmented curve, a tangential direction at an end point of the segmented curve, and partial curve information including at least one of a partial curve length of each of the partial curves or a number of points of the partial point sequence and information that mathematically defines the partial curve, curve information utilization determining unit for determining whether or not to use the stored segmented curve information when the partial curve is generated, and stored-information-utilized curve generating unit for generating a partial curve utilizing the segmented curve information. When the curve information utilization determining unit determines to utilize the stored information, the stored-information-utilized curve generating unit generates a partial curve. Thus, when a machining path provided by a point sequence is curved, in an area where a curve shaped similarly to another curve is to be generated, a curve meeting the requirement can be obtained.

The curve information utilization determining unit may be a unit for determining whether or not a current path is a backward path of a reciprocating machining path. The embodiment thus provides curves with smaller step-like differences between the forward path and the backward path of the reciprocating machining path than the conventional curving method.

The taking of the partial point sequence may be performed by selecting either a method based on the number of points or a method based on a length of the partial point sequence. Thus, in curving of the point sequence, time needed for curve generation can be reduced and similar curves can be generated, by applying division based on the length of the point sequence only to desired areas.

The selection of the method for taking the partial point sequence may be performed based on whether the tool path is a backward path of a reciprocating path or not. Thus, step-like differences between the forward path and backward path of the reciprocating machining path can be suppressed, with curves efficiently generated.

A machining curve creating method according to an embodiment of the preset invention involves creating a machining curve of a tool used to machine a workpiece by repeating a procedure of taking a part of a point sequence expressing the tool path as a partial point sequence and generating a partial curve. The machining curve creating method includes storing, for each of segmented curves that are individual curve sections providing the tool path, segmented curve information comprising a number of partial curves included in the segmented curve, a tangential direction at an end point of the segmented curve, and partial curve information including at least one of a partial curve length of each of the partial curves or a number of points of the partial point sequence and information that mathematically defines the partial curve, and determining whether or not to use the stored segmented curve information when the partial curve is generated, and upon determining that the stored segmented curve information is to be used, generating a partial curve utilizing the segmented curve information.

Whether or not the stored segmented curve information is used when the partial curve is generated may be determined depending on whether or not the tool path is a backward path of a reciprocating machining path.

The taking of the partial point sequence may be performed by selecting either a method based on the number of points or a method based on a length of the partial point sequence. Moreover, the selection of the method for taking the partial point sequence may be performed based on whether the tool path is a backward path of a reciprocating path.

The embodiments of the present invention are configured as described above and can thus provide a machining curve creating apparatus which stores information on a curve generated based on a point sequence expressing a tool path and which utilizes the information in an area where a curve similar to another curve is desired to be provided, to generate the desired curve.

BRIEF DESCRIPTION OF THE DRAWINGS

The above-described and other objects and features of the present invention will be apparent from the description below of embodiments taken with reference to the attached drawings where.

DETAILED DESCRIPTION OF THE PREFERRED EMBODIMENTS

Figure 1:
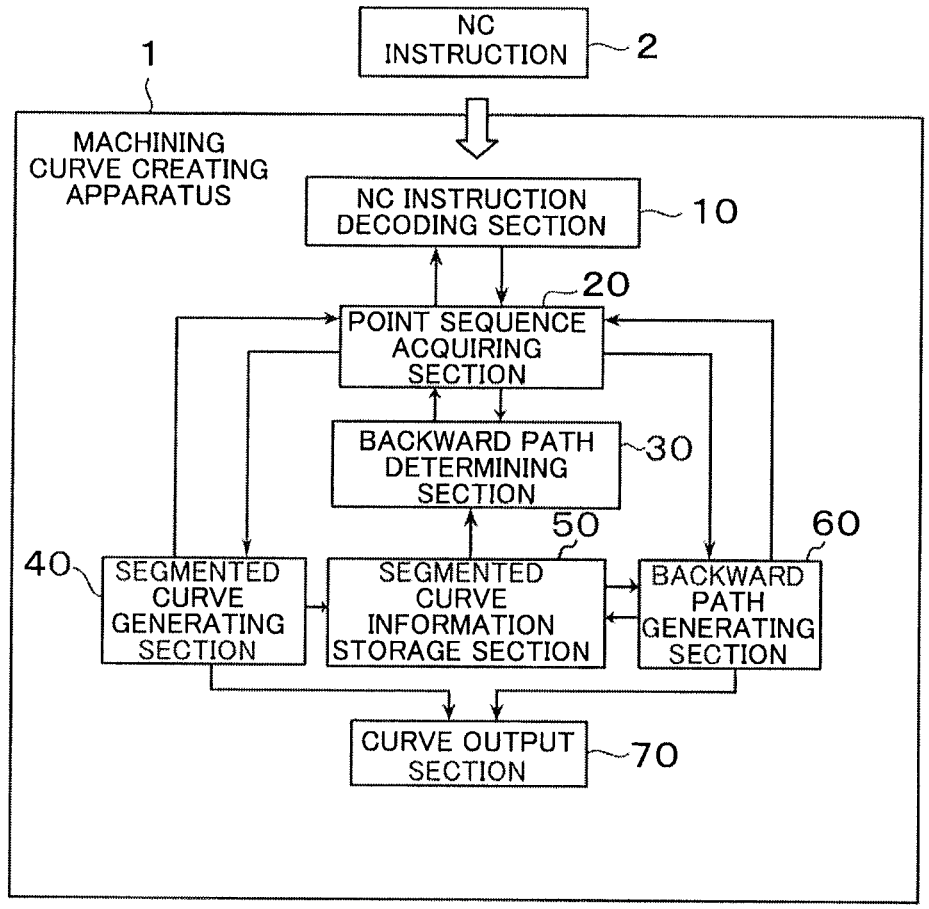
FIG. 1 is a block diagram illustrating a configuration of a machining curve creating apparatus.

Several embodiments of the present invention provide a curving method of generating a parametric curve by taking partial point sequences step by step from a tool path provided by a tool sequence, the method including storing information that characterizes a generated curve, and when a curve similar to the generated curve is desired to be provided, generating a curve using the stored information.

Several terms are defined. Partial point sequences are defined to be point sequences resulting from division of a point sequence for curve generation, and a partial curve is defined as a curve generated from a partial point sequence. A terminal point of a curve is defined to be a point where the tool path is folded so that, at the terminal point of the curve, the curve temporarily ends and another curve starts. A segmented curve is defined to extend from one terminal point to the next terminal point. A curved tool path is a set of segmented curves. The segmented curve includes one or more partial curves. A forward path and a backward path of a reciprocating path are each one segmented curve.

In a method according to several embodiments of the present invention, information on a curve generated using segmented curves as units is stored as segmented curve information. The segmented curve information includes the number of partial curves included in a segmented curve and partial curve information on each partial curve. The partial curve information includes the position of a terminal point, the length of the partial curve, and the number of points in a partial point sequence from which the partial curve originates. Division into partial point sequences is based on division by the number of points, which is easy to handle. A unit is provided which is configured to determine an area where the spatial distribution of partial point sequences on one path is to be aligned with the spatial distribution of partial point sequences on another path. When the method determines the area where the distribution of partial point sequences on one path is to be aligned with the distribution of partial point sequences on another path, the partial point sequences are retrieved based on the stored information rather than on the division by the number of points. For a reciprocating machining path, a backward path is an area where the distribution of partial point sequences is to be aligned with the distribution of partial point sequences on a forward path. When the tool path is determined to be a backward path, segmented curve information on the forward path is used to align the backward path with the forward path in terms of the number of partial curves included in the backward path, the length of each partial point sequence, and the like. In this manner, the spatial distributions of partial point sequences providing the forward path and the backward path are aligned with each other based on the stored information. This results in curves with no step-like differences between the forward path and the backward path.

The point of the method for creating a machining curve or the tool path curve is that an area where the shape of a curve is to be matched with the shape of another curve as in the case of the backward path with respect to the forward path and that, for the determined area, a dedicated generation procedure different from a normal curve generation procedure is used to generate a curve utilizing stored curve information.

Now, a specific procedure for a technique according to several embodiments of the present invention will be described taking, as an example, a case where the tool path includes a reciprocating machining path. FIG. 1 is a block diagram. A machining curve creating apparatus 1 includes an NC instruction decoding section 10, a point sequence acquiring section 20, a backward path determining section 30, a segmented curve generating section 40, a segmented curve information storage section 50, a backward path generating section 60, and a curve output section 70. The machining curve creating apparatus 1 can be configured using a numerical control apparatus that controls a machine tool or an information processing apparatus such as a personal computer.

Figure 2:
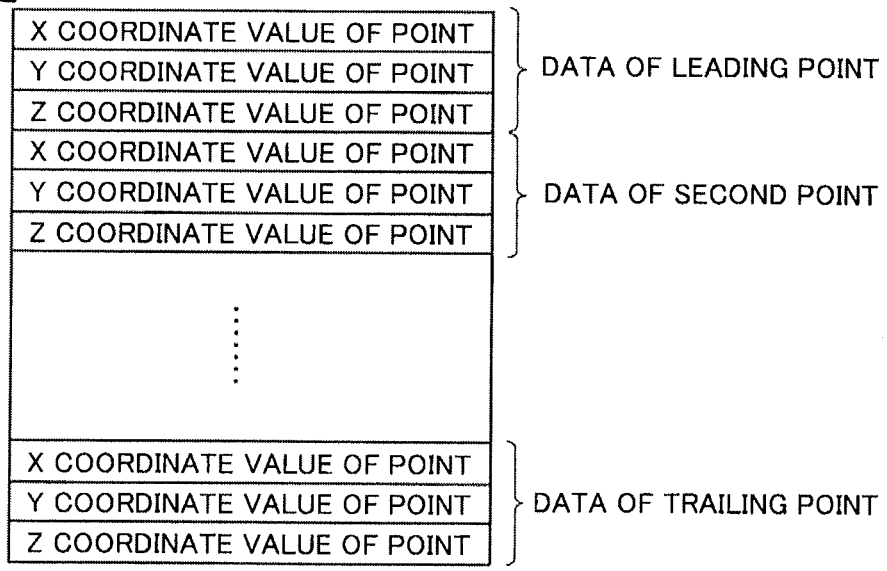
FIG. 2 is a diagram illustrating point sequence data.

The NC instruction decoding section 10 is the same as an NC instruction decoding section mounted in a numerical control apparatus that controls a machine tool. The NC instruction decoding section 10 decodes an NC instruction 2 (machining program) to retrieve point sequence data on a point sequence providing the tool path. The point sequence data is data indicative of the positions of points on the tool path, and for five-axis machining, includes data indicative of the direction of a tool in addition to the positions. FIG. 2 shows the structure of point sequence data for three-axis machining. Data on each point of the point sequence data includes the coordinates X, Y, and Z of a leading end of the tool. The number of data is equal to the number of the points.

The point sequence acquiring section 20 requests and acquires needed point sequence data from the NC instruction decoding section 10. Basically, data on a predetermined number N of points is acquired, and for a backward path, point sequence data within a range requested by the backward path curve generating section 60 is acquired. When any point in the requested point sequence is determined to be a folding point on the tool path, the range of point sequence data up to the folding point is acquired.

Figure 3:
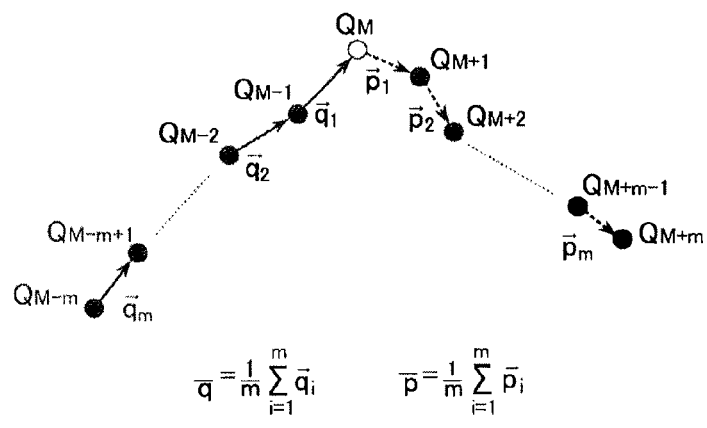
FIG. 3 is a diagram illustrating a method for determining folding points on a tool path.

In a machining program output by a CAM, points positioned in a locally disturbed manner may be output due to a computational problem. To allow such anomalous points to be distinguished from real folding points, q (bar) and p (bar) resulting from averaging of directions of segments joining point sequences together is determined so that the point is determined to be a folding point when a difference between the averaged directions is equal to or larger than a threshold. The q (bar) and the p (bar) are described in FIG. 3, where q (bar) and p (bar) are the followings.

$\vec{q}, \vec{p}$

The backward path determining section 30 receives point sequence data from the point sequence acquiring section 20 to determine whether or not the point sequence is a backward path. The determination uses information stored in the segmented curve information storage section 50 and will be described below in detail.

When the point sequence is determined not to be a backward path, the segmented curve generating section 40 repeats a process of acquiring a partial point sequence from the point sequence acquiring section 20 to generate a partial curve, thus generating a segmented curve with the folding point on the tool path corresponding to the end point of the segmented curve. The partial curve is a parametric curve passing through the start point and end point of a partial point sequence and by other points. A B spline curve is used as the parametric curve, but any other form of curve such as a NURBS curve or a polynomial curve may be used. The partial curve is expressed by:

$$\vec{C}(u) = \sum_{i=0}^{n} N_{i,3}(u) \vec{P}_i \qquad (1)$$

where u denotes a parameter for a curve and falls within the value range of $0 \leq u \leq 1$, $\vec{C}(u)$ denotes a position occupied by a point on the curve when the parameter value is u, $N_{1,3}(u)$ denotes a third-order B spline basis function, and $\vec{P}_i$ denotes a control point for a B spline curve.

A curve passing by a point unit that the distance between a curve expressed by Formula (1) and each of the points of a partial point sequence is equal to or smaller than a preset tolerance, that is, unit:

$$|\vec{C}(\overline{u}_k) - \vec{Q}_k| \leq \epsilon \quad (k=0,1,\ldots,N-1) \qquad (2)$$

where $\epsilon$ denotes a tolerance, $\vec{Q}_k$ denotes a point of the partial point sequence, $\overline{u}_k$ denotes the value of a parameter for a point on the curve which is closest to $\vec{Q}_k$, and $\vec{C}(\overline{u}_k)$ denotes a point obtained when the value of the parameter is $\overline{u}_k$.

The domain of the parameter u is divided by a set of numbers called knots $U = \{u_0, \ldots, u_{n+4}\}$. Thus, Formula (1) expresses a curve using the knots and the control points as variables. Determining values for the variables determines a curve. Several methods for determining such a curve as expressed by Formula (1) have been proposed and well known as described in Les Piegl, Wayne Tiller, The NURBS Book, Springer-Verlag and I. J. Schoenberg, Spline functions and the problem of graduation, Proceedings of the National Academy of Science of the U.S.A., 52(1964)). The description of the methods is omitted.

Figure 4:
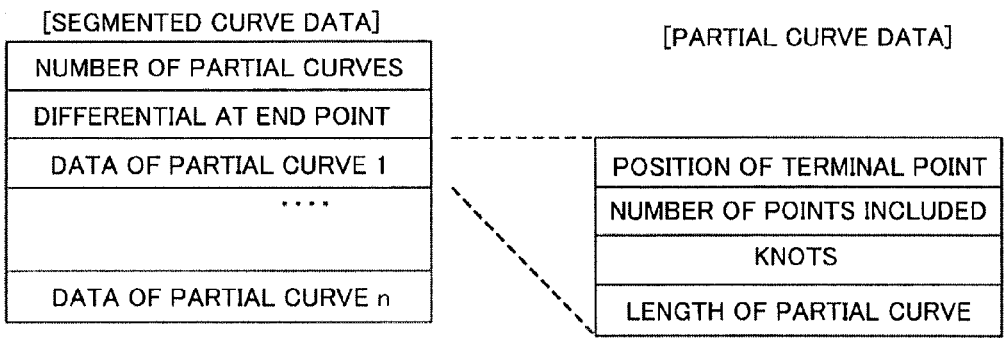
FIG. 4 is a diagram illustrating a relation between segmented curve data and partial curve data.

The segmented curve information storage section 50 stores information on a curve generated using segmented curves as units. FIG. 4 shows the structure of segmented curve data. The number of partial curves indicates the number of partial curves included in a segmented curve and takes a value of 1 or larger. A differential at an end point is the differential of a parametric curve at the end point. Partial curve data is storage of information on each of the partial curves included in the segmented curve, and has a structure shown in FIG. 4. The positions of terminal points represent the start point and end point of partial curves. The number of points represents the number of points included in a partial point sequence from which the partial curves originate. The knot is the value of each of knots of the partial curve expressed by a B spline curve and is a set of numerical values between 0 and 1. Length represents the length of a folding line resulting from joining of the points of the partial point sequence using segments. Information on segmented curves is stored so as to be utilized as information on a forward path when a backward path appears later. In general, the backward path is connected to the forward path via a short path, and thus, not many segmented curves are present between the forward path and the backward path. Thus, an upper limit is set for the number of stored segmented curve data so that, when the number of stored data reaches the upper limit value, the data is sequentially discarded starting with the oldest data.

Whether or not the tool path is a backward path is determined by comparing the point sequence from which a segmented curve is to be created and stored data on a segmented curve. When conditions (1) to (3) described below are all satisfied, the segmented curve to be created is determined to be the backward path for which the forward path is one of the stored segmented curves. Condition (1): Any of the stored segmented curves has, at the end point thereof, a tangential direction opposite to the tangential direction of the start point of the point sequence.

This means that the forward path and the backward path need to be in approximately opposite directions. Condition (2): The end point of the segmented curve is near the start point of the point sequence.

This means that the forward path and the backward path need to be spatially near from each other. Condition (3): The length of the segmented curve is approximately the same as the folding line length of the point sequence.

This means that the forward path and the backward path are approximately the same in length and that, if the length varies to some degree between the forward path and the backward path, better results can be achieved by using the same curve generating method as that for the forward path.

The backward path generating section 60 generates a curve based on the point sequence determined to be a backward path. The backward path includes the same number of partial curves as that of partial curves in the forward path. For the backward path, partial point sequences are taken out based on the point sequence length. The partial curves of the forward path are denoted by $C_1, \ldots, C_m$ ($C_m$ is the trailing partial curve) in order. The partial curves of the backward path are denoted by $C'_1, C'_m$ ($C'_m$ is the trailing partial curve) in order. $C'_{m-i+1}$ lies at a position opposite to $C_i$ (i=1, . . . , m). The scale of the backward path with respect to the forward path can be expressed by Formula (3) using the length L of a segmented curve that is a candidate for the forward path and the point sequence length L'.

$$r = \frac{L'}{L} \quad (3)$$

The partial point sequence from which C'm−i+1 originates is taken so that the point sequence length $l_{m-i+1}'$ of the partial point sequence is expressed by Formula (4) using the length $l_i$ of Ci and r.

$$l_{m-i+1}' = l_i \times r \quad (4)$$

In general, none of the points included in the point sequence is present at a position corresponding to $l_{m-i+1}'$, and thus, a new point is added to this position as an end point of the partial point sequence. Once the partial point sequence is thus determined, the same procedure for generating a partial curve as that for normal segmented curves may be used.

Figure 5:
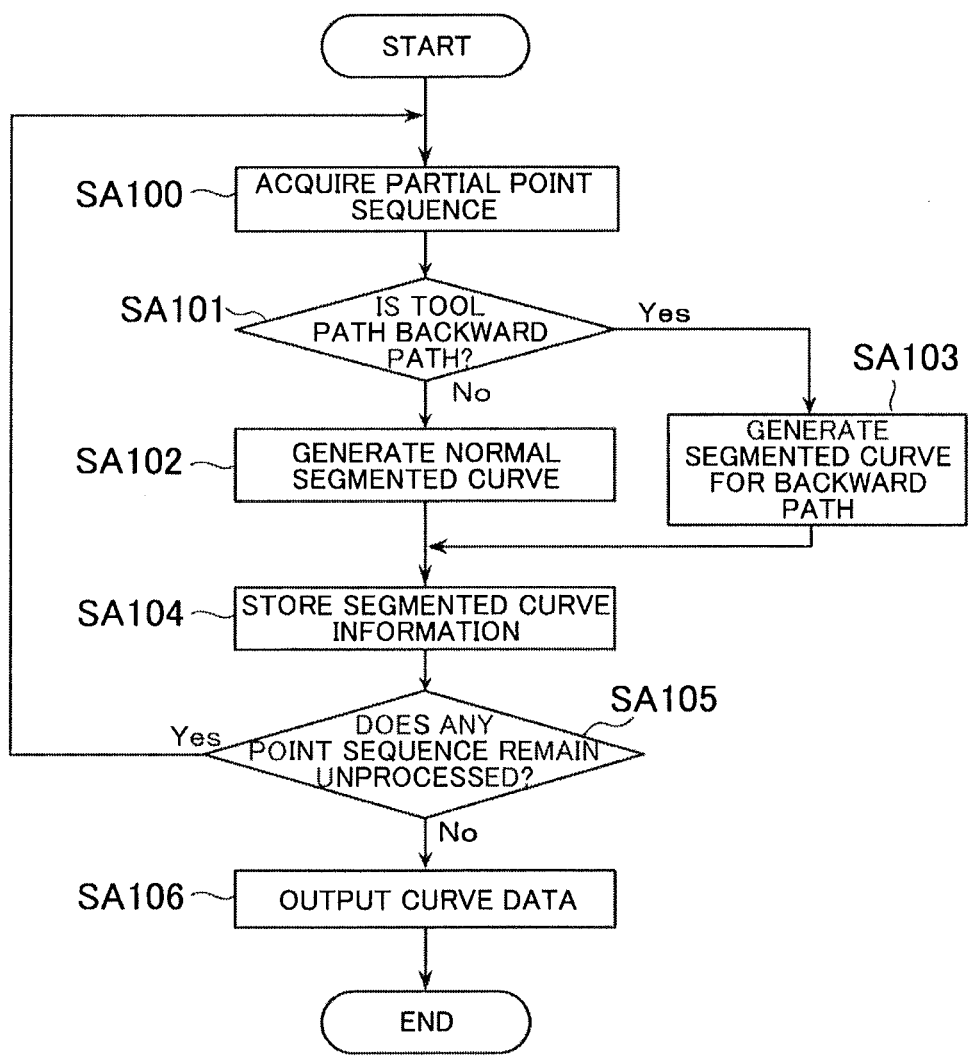
FIG. 5 is a flowchart illustrating a procedure for curve generation.

A procedure for generating a curve will be described in accordance with a flowchart in FIG. 5.

[Step SA100] A predetermined number of points are taken out from a specified point sequence.

[Step SA101] Whether or not the taken point sequence is a part of a backward path is determined. A method for the determination will be described below.

[Step SA102] If the point sequence is determined not to be a backward path, a segmented curve is generated using a normal method. The method will be described below.

[Step SA103] If the point sequence is determined to be a backward path, a segmented curve is generated using a method for the backward path. The method will be described below.

[Step SA104] Information on the generated segmented curve is stored in the segmented curve data.

[Step SA105] Whether or not any point of the specified point sequence remains not used for generating a curve is determined. If any point of the specified point sequence remains, the procedure returns to step SA100 to continue generating a curve. If all the points have been curved, the procedure proceeds to step SA106.

[Step SA106] Data on the generated curve is output to end the curve generation. In this case, the curve data is output after all the points are curved. However, more detailed outputs may be provided, for example, the data may be output each time one segmented curve is generated.

Figure 6:
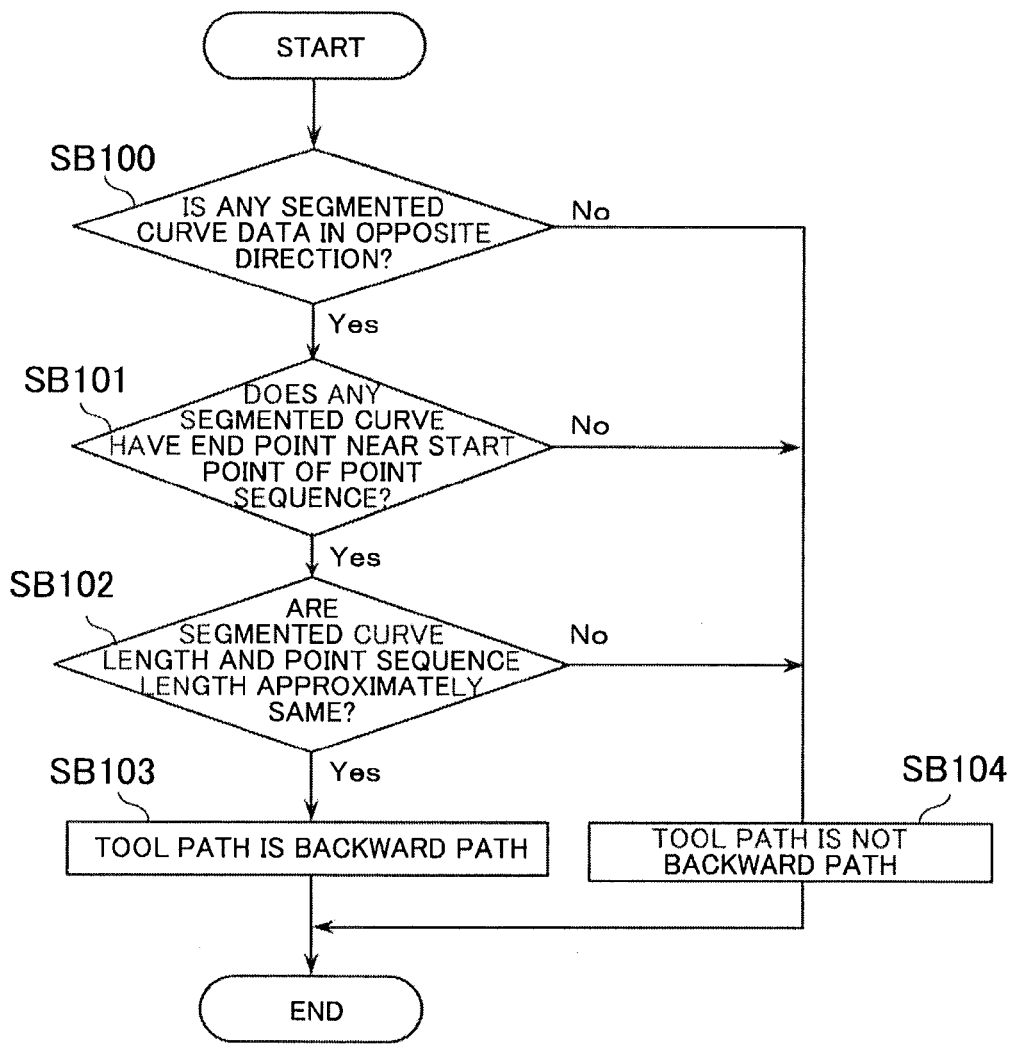
FIG. 6 is a flowchart illustrating a procedure for determining whether or not a tool path is a backward path.

Now, a procedure for the step SA101 of determining whether or not the tool path is a backward path will be described in accordance with a flowchart in FIG. 6.

[Step SB100] In accordance with Condition (1), the tangential direction of the start point of the partial point sequence is determined, and if any of the stored segmented curves has, at the end point thereof, a tangential direction opposite to the tangential direction of the start point of the partial point sequence, that segmented curve is determined to be a candidate and the procedure proceeds to step SB101. If none of the stored segmented curves has, at the end point thereof, a tangential direction opposite to the tangential direction of the start point of the partial point sequence, the procedure proceeds to step SB104. Any of various methods for determining the tangential direction may be used. For example, several points near the point of interest may be taken, and the directions of segments joining the points together may be averaged. Whether or not the tangents are opposite to each other is determined by comparing the angle θ between the two tangents with a threshold. The tangents are determined to be opposite to each other when the threshold≤θ≤180°.

[Step SB101] In accordance with Condition (2), the distance between the start point of the point sequence and the end point of the segmented curve determined in step SB100 to be a candidate for the forward path is determined, and when the distance is equal to or shorter than the threshold, the end point of the segmented curve is determined to be near the start point of the point sequence.

[Step SB102] In accordance with Condition (3), the length of the point sequence from which a segmented curve is to be generated is compared with the length of the segmented curve that is a candidate for the forward path. The length of the point sequence is assumed to be the length of a folding line that joins the points of the point sequence together. The end point of the point sequence is assumed to be the next folding point on the tool path. The above-described method for determining a folding point is used. The length of the segmented curve that is a candidate for the forward path is denoted by L, the point sequence length is denoted by L', and the threshold is denoted by k. Then, when Formula (5) is established, the point sequence and the segmented curve are determined to be approximately equal in length.

$$1 - k \leq \frac{L}{L'} \leq 1 + k \quad (5)$$

[Step SB103] A flag is set which indicates that the tool path is a backward path.

[Step SB104] A flag is dropped which indicates that the tool path is a backward path.

Figure 7:
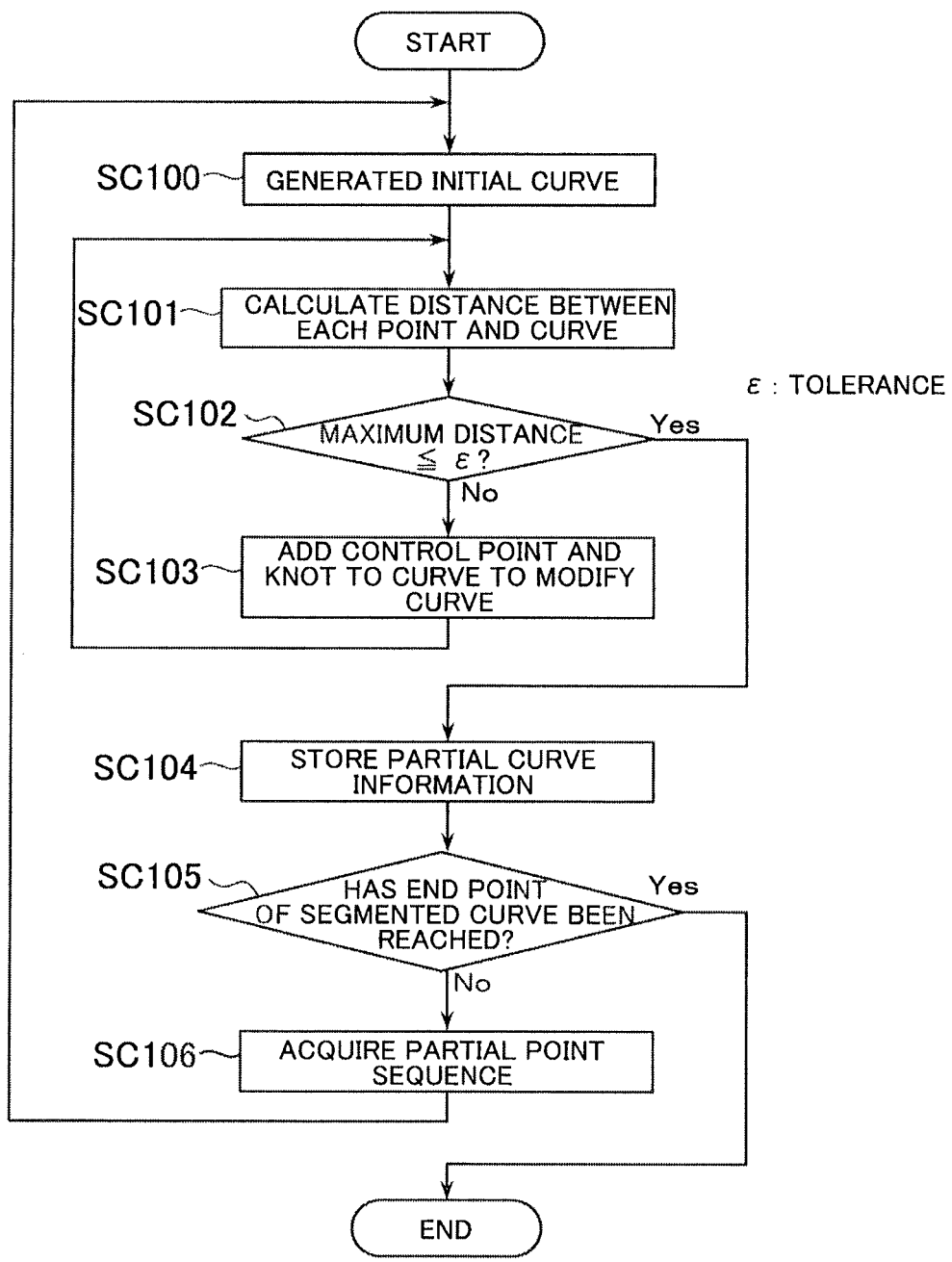
FIG. 7 is a flowchart illustrating a procedure for generating normal segmented curves.

Now, a procedure for the step SA102 in FIG. 5 of generating a normal segmented curve will be described in accordance with a flowchart in FIG. 7.

[Step SC100] An initial curve is a Bezier curve which passes through the start point and end point of the point sequence and for which differentials at the start points and end points have specified values. The value of the differential at the start point is determined using a method described in Les Piegl, Wayne Tiller, The NURBS Book, Springer-Verlag and using the start point and points near the start point. This also applies to the end point. Another method may use a differential at the start point of a Bezier curve passing through the end point and three points near the start point. For the end point, a differential at the end point of a Bezier curve passing through the start point and three points near the end point.

[Step SC101] The distance between the curve and each of the points of the partial curve given by Formula (2) is determined, and the maximum value of the distance is obtained.

[Step SC102] When the maximum value is equal to or smaller than the tolerance, the current curve is determined to be a partial curve, and the process is ended. When the maximum value is larger than the tolerance, the procedure proceeds to step SC103.

[Step SC103] One internal knot and one control point are added to the curve to modify the curve, and the procedure returns to step SC101. The value of the added knot is determined using any of the methods described in Les Piegl, Wayne Tiller, The NURBS Book, Springer-Verlag. The modified curve is a B spline curve expressed in the form of Formula (1).

[Step SC104] Information on the generated partial curve is stored in the partial curve data.

[Step SC105] When the end point of the last generated partial curve is a folding point on the tool path, the end point of the segmented curve is determined to have been reached, and the process is ended. When the end point of the last generated partial curve is not a folding point on the tool path, the process proceeds to step SC106.

[Step SC106] A sequence of a predetermined number of points is newly taken out as a partial point sequence, and the procedure returns to the step SC100 of generating an initial curve.

Figure 8:
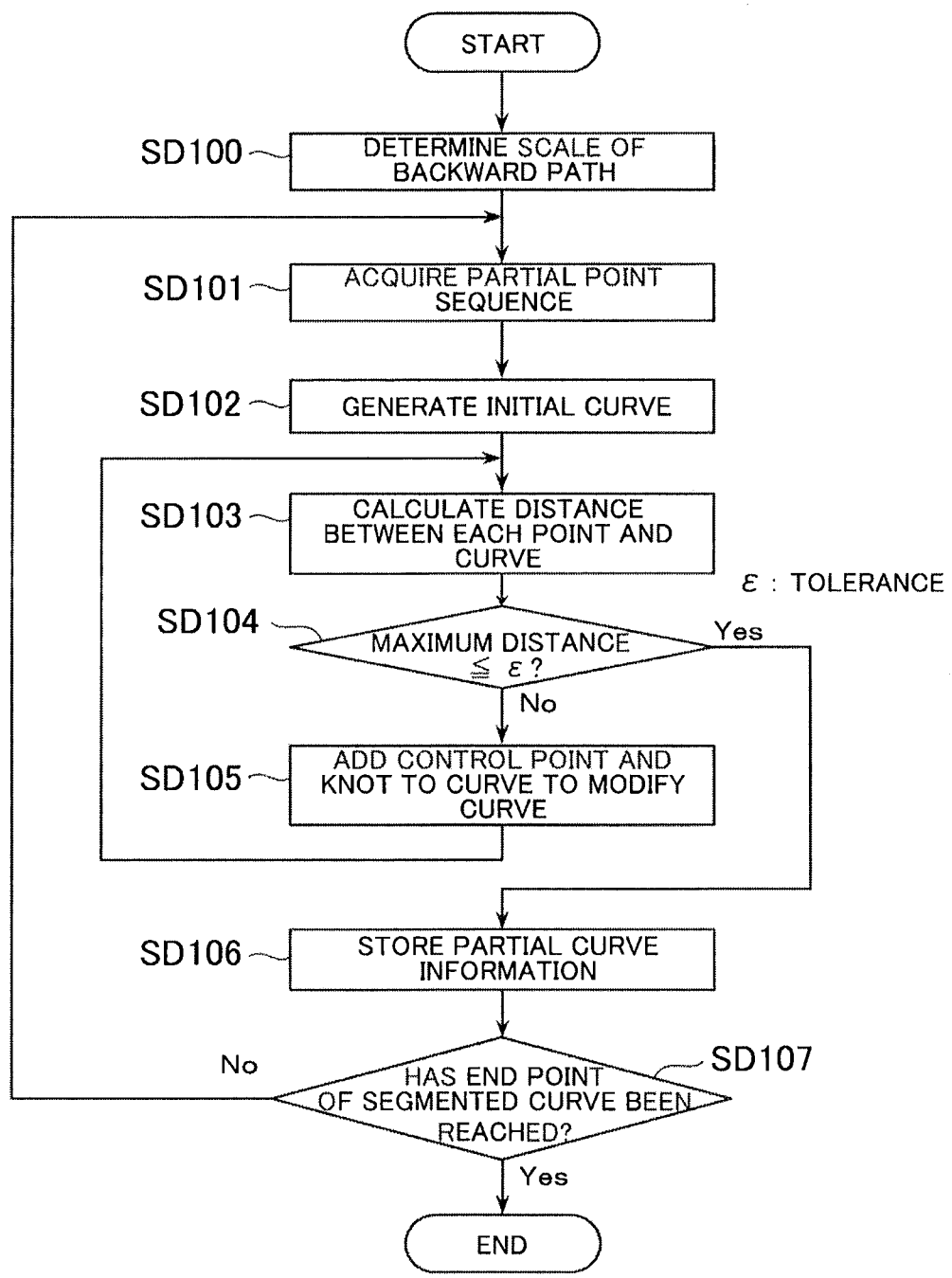
FIG. 8 is a flowchart illustrating a procedure for generating segmented curves of the backward path.

Finally, a procedure for step SA103 in FIG. 5 where the segmented curve of the backward path is generated will be described in accordance with a flowchart in FIG. 8.

[Step SD100] The value of r in Formula (3) is determined. When the tool path is determined to be a backward path, the point sequence has been read up to the end point of the backward path. Thus, the value of L' can be determined.

[Step SD101] A partial point sequence is taken out so that the resultant point sequence length is equal to the length given by Formula (4).

[Step SD102] Knots are acquired from the partial curve data on the corresponding partial curve of the forward path and inverted. The inverted knots are used to generate a B spline curve. The inversion of a knot means that, when the original knot is denoted by $u_i$, a new knot expressed by $1-u_i$ is created. For the normal segmented curve generation, the initial curve is a Bezier curve, whereas the curve of the backward path is a B spline curve obtained using information on the forward path.

[Step SD103] to [Step SD105] Processing in these steps of generating a partial curve itself is the same as the processing for the normal segmented curve generation.

[Step SD106] Processing for storing partial curve information is also the same as the processing in the normal segmented curve generation.

[Step SD107] Processing for determining the end of the segmented curve generation is also the same as the processing in the normal segmented curve generation.

The curve output section 70 outputs data on the resultant curve in a predetermined format. When a curve generating apparatus is separated from the numerical control apparatus, the curve output section 70 converts the curve into a format that can be decoded by the numerical control apparatus, for example, a NURBS instruction format. When the curve generating apparatus is built into the numerical control apparatus so that the machine tool can perform machining while converting the data into the curve, the curve output section 70 coverts the data into an internal format that can be easily processed by the numerical control apparatus, that is, a format output by the NC instruction decoding section when a machining program includes a curve interpolation instruction.

In the embodiments, the B spline curve is used as a parametric curve. To expand the parametric curve to another form of curve such as a NURBS curve, the same concept may be applied to the curve with the expression form of Formula 1 changed.

What is claimed is:

1. A machining curve creating apparatus for creating a machining curve of a tool used to machine a workpiece by repeating taking, as a partial point sequence, a part of a point sequence expressing a tool path and generating a partial curve, the machining curve creating apparatus comprising:
    a segmented curve information storage unit configured to store, for each segmented curve of a plurality of segmented curves that are individual curve sections providing the tool path, segmented curve information comprising a number of the generated partial curves included in the segmented curve, a tangential direction at an end point of the segmented curve, and partial curve information in association with the segmented curve, wherein the partial curve information includes at least one of (i) a partial curve length of each of the generated partial curves and (ii) a number of points of the partial point sequence and information that mathematically defines the partial curve;
    a curve information utilization determining unit configured to compare a characterizing value with the segmented curve information of each segmented curve upon which the partial curve is generated, the characterizing value including at least one of (i) a direction of the point sequence from which the curve is to be generated and (ii) a folding line length, check whether the segmented curve to which the partial curve is to be conformed has already been generated and the corresponding segmented curve information is stored, and when the corresponding segmented curve information is stored, determine to use the stored segmented curve information when the partial curve is generated; and
    a stored-information-utilized curve generating unit configured to generate a partial curve utilizing the segmented curve information, wherein the partial curve is generated based on the segmented curve information of the stored information utilized curve generating unit to which the partial curve is to be conformed and the information on the partial curve defining the segmented curve, when the curve information utilization determining unit determines to utilize the stored segmented curve information.

2. The machining curve creating apparatus according to claim 1, wherein the curve information utilization determining unit is configured to determine whether the tool path is a backward path of a reciprocating machining path.

3. The machining curve creating apparatus according to claim 1, the machining curve creating apparatus is further configured to take the partial point sequence by selecting either taking based on the number of points or taking based on a length of the partial point sequence.

4. The machining curve creating apparatus according to claim 3, wherein the selection of the method for taking the partial point sequence is performed based on whether the tool path is a backward path of a reciprocating path.

5. A machining curve creating method for creating a machining curve of a tool used to machine a workpiece by repeating a procedure of taking a part of a point sequence expressing a tool path as a partial point sequence and generating a partial curve, the machining curve creating method comprising:
  storing, for each segmented curve of a plurality of segmented curves that are individual curve sections providing the tool path, segmented curve information comprising a number of the generated partial curves included in the segmented curve, a tangential direction at an end point of the segmented curve, and partial curve information in association with the segmented curve, wherein the partial curve information includes at least one of (i) a partial curve length of each of the partial curves and (ii) a number of points of the partial point sequence and information that mathematically defines the partial curve;
  comparing a characterizing value with the segmented curve information of each segmented curve upon which the partial curve is generated, the characterizing value including at least one of (i) a direction of the point sequence from which the curve is to be generated and (ii) a folding line length;
  checking whether the segmented curve to which the partial curve is to be conformed has already been generated and the corresponding segmented curve information is stored;
  when the corresponding segmented curve information is stored, determining to use the stored segmented curve information when the partial curve is generated; and
  when determining that the stored segmented curve information is to be used, generating a partial curve utilizing the segmented curve information, wherein the partial curve is generated based on the stored segmented curve information to which the partial curve is to be conformed and the information on the partial curve defining the segmented curve.

6. The machining curve creating method according to claim 5, wherein whether the stored segmented curve information is used when the partial curve is generated is determined depending on whether the tool path is a backward path of a reciprocating machining path.

7. The machining curve creating method according to claim 5, wherein the taking of the partial point sequence is performed by selecting either a method based on the number of points or a method based on a length of the partial point sequence.

8. The machining curve creating method according to claim 7, wherein the selection of the method for taking the partial point sequence is performed based on whether the tool path is a backward path of a reciprocating path.

* * * * *